(12) United States Patent
Ho et al.

(10) Patent No.: US 9,406,329 B1
(45) Date of Patent: Aug. 2, 2016

(54) HAMR MEDIA STRUCTURE WITH INTERMEDIATE LAYER UNDERLYING A MAGNETIC RECORDING LAYER HAVING MULTIPLE SUBLAYERS

(71) Applicant: WD Media, LLC, San Jose, CA (US)

(72) Inventors: Hoan Cong Ho, San Jose, CA (US); Hua Yuan, San Jose, CA (US); Tomoko Seki, Sunnyvale, CA (US); Antony Ajan, San Jose, CA (US); Paul C. Dorsey, Los Altos, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/954,397

(22) Filed: Nov. 30, 2015

(51) Int. Cl.
| | |
|---|---|
| *G11B 11/00* | (2006.01) |
| *G11B 5/738* | (2006.01) |
| *G11B 5/66* | (2006.01) |
| *G11B 5/73* | (2006.01) |
| *G11B 5/84* | (2006.01) |
| *G11B 5/00* | (2006.01) |

(52) U.S. Cl.
CPC ........ *G11B 5/738* (2013.01); *G11B 5/66* (2013.01); *G11B 5/7325* (2013.01); *G11B 5/8404* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gomicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |

(Continued)

OTHER PUBLICATIONS

Kumar Srinivasan, et al., U.S. Appl. No. 14/556,993, filed Dec. 1, 2014, 33 pages.

*Primary Examiner* — Peter Vincent Agustin

(57) ABSTRACT

Segregants for magnetic recording layers and materials for intermediate layers underlying the magnetic recording layers are provided for improved heat assisted magnetic recording (HAMR) media. One such HAMR medium includes a substrate, a heat sink layer on the substrate, an underlayer on the heat sink layer, an intermediate layer of TiON, VON, CrON, TiOC, VOC, TiONC, and/or combinations thereof, on the underlayer, and a magnetic recording layer of FePt on the intermediate layer. The magnetic recording layer further includes three sublayers, each having a different segregant. The segregant of the first magnetic recording sublayer on the intermediate layer includes AgBN, AgCN, AgBNC, $AgB_2O_3$, $AgMoO_3$, $AgV_2O_5$, $B_2O_3$, $MoO_3$, $V_2O_5$, and/or combinations thereof.

31 Claims, 5 Drawing Sheets

(56) References Cited

U.S. PATENT DOCUMENTS

| | | |
|---|---|---|
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,620,531 B1 | 9/2003 | Cheng |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |

(56) References Cited

U.S. PATENT DOCUMENTS

| | | | |
|---|---|---|---|
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B2 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,623,670 B1 * | 1/2014 | Mosendz | G11B 5/84 438/3 |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 8,696,404 B2 | 4/2014 | Sun et al. | |
| 8,711,499 B1 | 4/2014 | Desai et al. | |
| 8,743,666 B1 | 6/2014 | Bertero et al. | |
| 8,758,912 B2 | 6/2014 | Srinivasan et al. | |
| 8,787,124 B1 | 7/2014 | Chernyshov et al. | |
| 8,787,130 B1 | 7/2014 | Yuan et al. | |
| 8,791,391 B2 | 7/2014 | Bourez | |
| 8,795,765 B2 | 8/2014 | Koike et al. | |
| 8,795,790 B2 | 8/2014 | Sonobe et al. | |
| 8,795,857 B2 | 8/2014 | Ayama et al. | |
| 8,800,322 B1 | 8/2014 | Chan et al. | |
| 8,811,129 B1 | 8/2014 | Yuan et al. | |
| 8,817,410 B1 | 8/2014 | Moser et al. | |
| 8,941,950 B2 | 1/2015 | Yuan et al. | |
| 9,076,476 B2 | 7/2015 | Kryder et al. | |
| 9,269,480 B1 * | 2/2016 | Ajan | H01F 1/0027 |
| 2002/0060883 A1 | 5/2002 | Suzuki | |
| 2003/0022024 A1 | 1/2003 | Wachenschwanz | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0070549 A1 | 3/2007 | Suzuki et al. | |
| 2007/0245909 A1 | 10/2007 | Homola | |
| 2008/0075845 A1 | 3/2008 | Sonobe et al. | |
| 2008/0093760 A1 | 4/2008 | Harper et al. | |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0038079 A1 * | 2/2011 | Choe | G11B 5/65 360/122 |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0214021 A1 | 8/2012 | Sayama et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0216865 A1 | 8/2013 | Yasumori et al. | |
| 2013/0230647 A1 | 9/2013 | Onoue et al. | |

(56) References Cited

U.S. PATENT DOCUMENTS

| | | |
|---|---|---|
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0093748 A1* | 4/2014 | Chen .................. G11B 5/7325 428/831 |
| 2014/0151360 A1 | 6/2014 | Gregory et al. |
| 2014/0234666 A1 | 8/2014 | Knigge et al. |
| 2015/0138939 A1* | 5/2015 | Hellwig .................. G11B 5/66 369/13.41 |
| 2015/0194175 A1* | 7/2015 | Chen ....................... C23C 14/06 428/832 |

\* cited by examiner

HAMR MEDIA STRUCTURE WITH INTERMEDIATE LAYER UNDERLYING A MAGNETIC RECORDING LAYER HAVING MULTIPLE SUBLAYERS

BACKGROUND

Energy/Heat Assisted Magnetic Recording (EAMR/HAMR) systems can potentially increase the areal density of information recorded magnetically on various media. For example, to achieve magnetic information storage levels beyond 1 terabit per inch squared, smaller grain size media may be required. Such designs can demand higher Ku materials for a magnetic recording layer to sustain thermal stability, such as $L1_0$ ordered FePt alloys.

The layer beneath the FePt magnetic recording layer (e.g., intermediate layer or underlayer) may be important to the media design to achieve the desired microstructure of the FePt magnetic recording layer. For example, one aspect controlling the FePt microstructure is the interfacial energy between the FePt magnetic recording layer and the intermediate layer, which varies depending on the segregant in the FePt magnetic recording layer and the intermediate layer properties. Recently, HAMR media including FePt magnetic recording layers has been optimized in terms of microstructure and magnetic properties using an MgO intermediate layer, together with a carbon segregant in the FePt magnetic recording layer.

However, when using intermediate layers other than MgO, carbon may not be an ideal segregant. For example, other intermediate layer materials may cause carbon to diffuse away from the intermediate layer interface, resulting in the formation of larger interconnected FePt grains. Accordingly, an improved HAMR media structure that addresses these shortcomings is needed.

DETAILED DESCRIPTION

Figure 1:
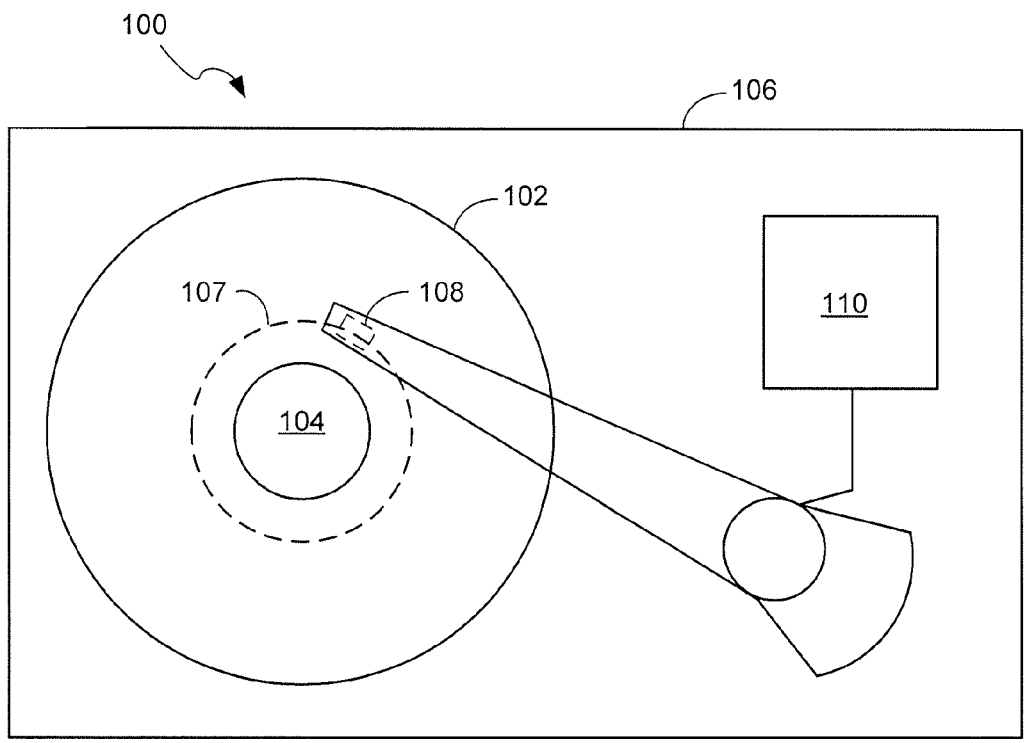
FIG. 1 is a top schematic view of a disk drive configured for heat assisted magnetic recording (HAMR) and including a magnetic medium with a FePt magnetic recording layer, intermediate layer and underlayer in accordance with one embodiment of the invention.

Referring now to the drawings, embodiments of heat assisted magnetic recording (HAMR) media that include a heat sink layer, an underlayer on the heat sink layer, an intermediate layer on the underlayer, and an FePt magnetic recording layer on the intermediate layer are illustrated. One such HAMR media design includes a FePt magnetic recording layer having a first FePt magnetic recording sublayer on the intermediate layer, a second FePt magnetic recording sublayer on the first FePt magnetic recording sublayer and a third FePt magnetic recording sublayer on the second FePt magnetic recording sublayer. Each of the FePt magnetic recording sublayers includes a different segregant. The segregant in the first FePt magnetic recording sublayer and the material used for the intermediate layer are selected to produce a substantially uniform distribution of segregant at the interface between the first FePt magnetic recording sublayer and the intermediate layer, thereby resulting in a substantially uniform FePt granular microstructure. In an aspect, an intermediate layer of TiON, VON, CrON, TiOC, VOC, TiONC, VONC, and/or combinations thereof, is utilized together with a segregant of AgBN, AgCN, AgBNC, $AgB_2O_3$, $AgMoO_3$, $AgV_2O_5$, $B_2O_3$, $MoO_3$, $V_2O_5$, and/or combinations thereof, in the first FePt magnetic recording sublayer.

The terms "above," "over," "on," "below," "under," and "between" as used herein refer to a relative position of one layer with respect to other layers. As such, one layer deposited or disposed above, over, on, below, or under another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

FIG. 1 is a top schematic view of a disk drive 100 configured for heat assisted magnetic recording (HAMR) and including a magnetic medium 102 with an FePt magnetic recording layer having multiple sublayers and intermediate layer underlying the FePt magnetic recording layer (not shown in FIG. 1, but see FIG. 3) in accordance with one embodiment of the invention. The laser (not visible in FIG. 1, but see FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 104 may have magneto-resistive (MR), or giant magneto-resistive (GMR) elements. In another embodiment, head 104 may be another type of head, for example, an inductive read/write head or a Hall Effect head.

In operation, a spindle motor (not shown) rotates the spindle assembly 104, and thereby rotates disk 102 to position head 108 at a particular location along a desired disk track. The position of head 104 relative to disk 102 may be controlled by position control circuitry 110.

Figure 2:
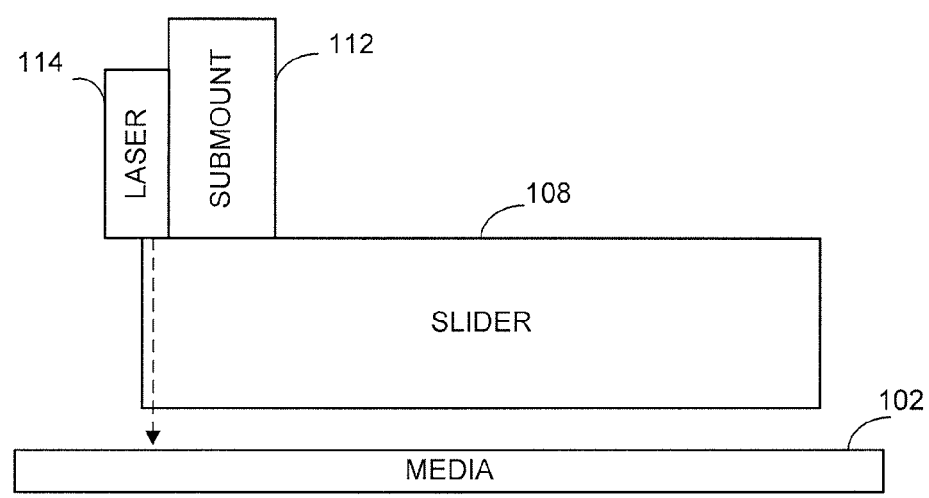
FIG. 2 is a side cross sectional schematic view of selected components of the HAMR system of FIG. 1 including the magnetic medium with the FePt magnetic recording layer, intermediate layer and underlayer in accordance with one embodiment of the invention.

FIG. 2 is a side cross sectional schematic view of selected components of the HAMR system of FIG. 1 including the magnetic medium 102 with the FePt magnetic recording layer having multiple sublayers and intermediate layer underlying the FePt magnetic recording layer (not shown in FIG. 2, but see FIG. 3) in accordance with one embodiment of the invention. The HAMR system components also include a submount 112 attached to a top surface of the slider 108. A laser 114 is attached to the sub-mount 112, and possibly to the slider 108. The slider 108 includes the write element and the read element positioned along an air bearing surface (ABS) of the slider for writing information to, and reading information from, respectively, the media 102.

In operation, the laser 114 is configured to direct light energy to a waveguide in the slider 108 which directs the light to a near field transducer (NFT) near the air bearing surface (e.g., bottom surface) of the slider. Upon receiving the light from the laser via the waveguide, the NFT generates localized heat energy that heats a portion of the media 102 near the write element and the read element. FIGS. 1 and 2 illustrate a specific embodiment of a HAMR system. In other embodiments, the improved media with the FePt magnetic recording layer and intermediate layer can be used in other suitable HAMR systems.

Figure 3:
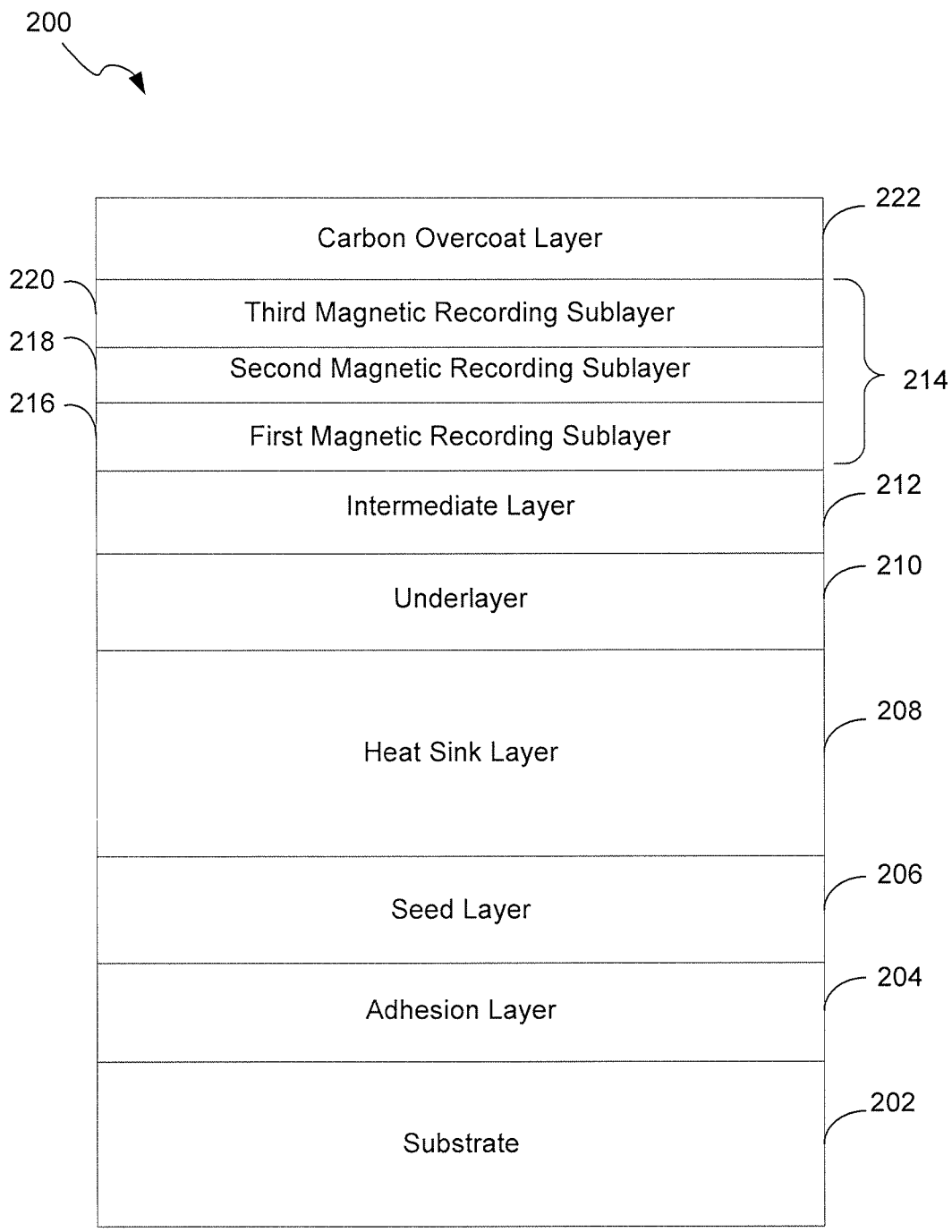
FIG. 3 is side cross sectional view of a HAMR medium having a FePt magnetic recording layer, intermediate layer and underlayer in accordance with one embodiment of the invention.

FIG. 3 is side cross sectional view of a HAMR medium 200 having a magnetic recording layer 214 with multiple sublayers and an intermediate layer 212 underlying the magnetic recording layer 214 in accordance with one embodiment of the invention. The medium 200 has a stacked structure with a glass substrate 202 at a bottom/base layer, an adhesion layer 204 on the glass substrate 202, a seed layer 206 on the adhesion layer 204, a heat sink layer 208 on the seed layer 206, an underlayer 210 on the heat sink layer 208, the intermediate layer 212 on the underlayer 210, the magnetic recording layer 214 on the intermediate layer 212, and a carbon overcoat layer 222 on the magnetic recording layer 214. In some embodiments, the adhesion layer 204, seed layer 206, and carbon overcoat layer 222 can be omitted from the medium structure.

The magnetic recording layer 214 includes a first magnetic recording sublayer 216 on the intermediate layer 212, a second magnetic recording sublayer 218 on the first magnetic recording sublayer 216, and a third magnetic recording sublayer 220 on the second magnetic recording sublayer 218. Each of the magnetic recording sublayers 216, 218, and 220 is made of FePt. In an exemplary embodiment, each of the magnetic recording sublayers 216, 218, and 220 includes $L1_0$ phase FePt. Providing three sublayers in the FePt magnetic recording layer 214 enables growth of columnar and thick granular media, which results in low roughness, improved read-back signal and improved overall media performance.

Each of the magnetic recording sublayers 216, 218, and 220 includes one or more segregants. In one embodiment, the segregant included in each of the magnetic recording sublayers is different. The segregant in the first FePt magnetic recording sublayer 216 and the material used for the intermediate layer 212 are selected to produce a substantially uniform distribution of segregant at the interface between the first FePt magnetic recording sublayer 216 and the intermediate layer 212, thereby resulting in a substantially uniform FePt granular microstructure. In one instance, a substantially uniform FePt granular microstructure is produced when the FePt grain diameter is between about 7.5 nm and about 8.5 nm with a standard deviation of between about 2.5 nm and about 3.5 nm. In one embodiment, an intermediate layer 212 of TiON, VON, CrON, TiOC, VOC, TiONC, VONC, and/or combinations thereof, is utilized together with a segregant of AgBN, AgCN, AgBNC, $AgB_2O_3$, $AgMoO_3$, $AgV_2O_5$, $B_2O_3$, $MoO_3$, $V_2O_5$, and/or combinations thereof, in the first FePt magnetic recording sublayer 216. In other embodiments, the segregant in the first magnetic recording sublayer may include other oxide, nitride or carbide segregants that have a surface energy less than 0.1 Joules per meter squared ($J/m^2$).

For example, in an exemplary embodiment, the intermediate layer 212 includes $TiO_xN_{(1-x)}$, where x is between about 0.4 and about 0.5. In another exemplary embodiment, the segregant in the first magnetic recording sublayer 216 includes AgBN. In a further exemplary embodiment, the first magnetic recording sublayer 216 includes an AgBN segregant having a BN content in the AgBN segregant that may be between about 25 mole percent and about 40 mole percent. In still a further exemplary embodiment, the first magnetic recording sublayer 216 includes an AgBN segregant and the intermediate layer 212 includes TiON.

In one embodiment, the underlayer 210 can be made of one or more materials such as TiN, CrN, VN, TiC, VC, RuAl, RuTi, FeAl, $SrTiO_3$, $BaTiO_3$, $BaSnO_3$, MgO, W, Mo, Cr, NiAl, combinations thereof, and/or other suitable materials known in the art. For example, in an exemplary embodiment, the underlayer 210 includes TiN and the intermediate layer includes TiON.

In several embodiments, the intermediate layer 212 operates as a thermal barrier layer. For example, the intermediate layer 212 may be configured to (e.g., the materials for the intermediate layer are selected to) facilitate a heat transfer from the magnetic recording layer 214 to the heat sink layer 208, and impede a heat transfer from the heat sink layer 208 to the magnetic recording layer 214.

In several embodiments, the thermal conductivity (κ) of the intermediate layer 212 is less than the thermal conductivity of the underlayer 210. For example, in embodiments in which the intermediate layer 212 includes $TiO_xN_{(1-x)}$ (where x=0.4 to 0.5) and the underlayer 210 includes TiN, the thermal conductivity of $TiO_xN_{(1-x)}$ is about 5 Watts per meter Kelvin (W/mK), whereas the thermal conductivity of TiN is about 10 W/mK. This can also be compared to the thermal conductivity of MgO, which is around 10 W/mK. Thus, utilizing an intermediate layer 212 of $TiO_xN_{(1-x)}$ underneath the magnetic recording layer provides improved thermal conductivity properties of the HAMR medium 200 as compared to using MgO as the intermediate layer.

In addition, $TiO_xN_{(-x)}$ may further provide improved optical properties over that provided by MgO. For example, the plasmonic effect observable in TiON may improve the optical impedance of the HAMR medium 200 during writing operations. Furthermore, the use of TiON may also result in similar or better magnetic performance in the magnetic recording layer(s) than the use of MgO.

In one embodiment, the segregant in the second magnetic recording sublayer 218 can be made of one or more materials such as BNC, BN, combinations thereof, and/or other suitable materials known in the art. In addition, the segregant in the third magnetic recording sublayer 220 can be made of one or more materials such as $BNSiO_2$, $BNZrO_2$, $BNTa_2O_5$, combinations thereof, and/or other suitable materials known in the art.

In one embodiment, the substrate 202 can be made of one or more materials such as an Al alloy, NiP plated Al, glass, glass ceramic, and/or combinations thereof. In one embodiment, the adhesion layer 204 can includes one or more materials such as CrTa, NiTa, combinations thereof, and/or other suitable materials known in the art.

In one embodiment, the seed layer 206 can be made of one or more materials such as RuAl, Cr, combinations thereof, and/or other suitable materials known in the art. In one embodiment, the heat sink layer 208 can be made of one or more materials such as W, Mo, Cr, Ru, Cu, Ag, Cu alloy, Ag alloy, combinations thereof, and/or other suitable materials known in the art.

In one embodiment, an intermediate layer 212 of TiON is deposited using a non-reactive sputtering process with a composite target of TiON. In another embodiment, an underlayer 210 of TiN and an intermediate layer 212 of TiON are sputter-deposited using a pure TiN target with a two-step process in one chamber. In the first step, the TiN underlayer 210 can be sputter-deposited first using pure Ar gas. Then, in the second step, the TiON intermediate layer 212 can be formed using a dc-reactive sputtering process in a mixture of Ar and $O_2$ gas. In an aspect, the amount of oxygen in the TiON intermediate layer can be tuned by varying the ratio of the $Ar/O_2$ flow rate to maximize the texture quality of the FePt magnetic recording layer. For example, the $O_2$ content in the $Ar/O_2$ mixture can vary between about 1.6 percent and about 1.8 percent, thus producing an intermediate layer of $TiO_xN_{(1-x)}$, where x is between about 0.4 and about 0.5. In addition, as the oxygen percentage increases, the transmittance and reflectance of the TiON intermediate layer increases. Therefore, in embodiments in which higher transmittance and reflectance of the TiON intermediate layer are desired, the $O_2$ content percentage can be greater than or equal to 1.8 percent. However, at $O_2$ content percentages higher than 1.8 percent, the FePt texture quality may degrade.

Figure 4:
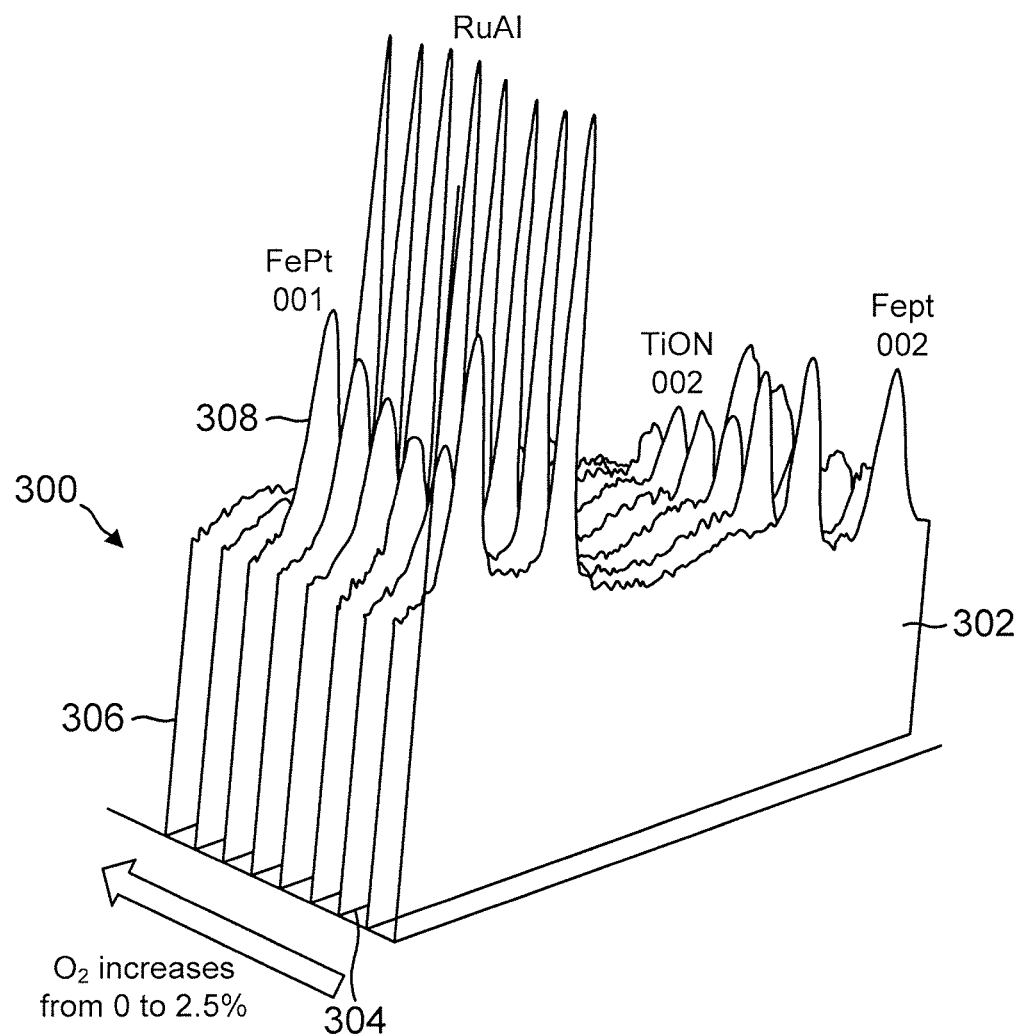
FIG. 4 illustrates exemplary X-ray diffraction (XRD) patterns exemplifying perpendicular textures of FePt magnetic recording layers on TiON intermediate layers at different sputter oxygen percentages of the TiON intermediate layer in accordance with one embodiment of the invention.

FIG. 4 illustrates exemplary X-ray diffraction (XRD) patterns 300 exemplifying perpendicular textures of FePt magnetic recording layers on TiON intermediate layers at different sputter oxygen percentages of the TiON intermediate layer in accordance with one embodiment of the invention. Each XRD pattern 300 provides a measurement of the intensity over a range of angles (2θ) of the detector. A baseline XRD pattern 302 illustrates the intensity of a FePt—C magnetic recording layer over an MgO intermediate layer. Pronounced peaks of the FePt magnetic recording layer with (001) and (002) texture appear in the baseline XRD pattern 302, indicating a high quality FePt magnetic recording layer (good FePt microstructure/texture).

Each XRD pattern behind the baseline XRD pattern illustrates the intensity of a FePt—AgBN magnetic recording layer over a TiON intermediate layer at a particular sputter oxygen percentage of TiON. The $O_2$ percentage utilized in the dc-reactive sputtering process of TiON increases from 0 percent in the first XRD pattern 304 behind the baseline XRD pattern 302 to 2.5 percent in the last XRD pattern 306. As can be seen in FIG. 4, XRD pattern 308, representing an $O_2$ percentage between about 1.6 and 1.8, provides the best texture and is comparable to the texture achieved using MgO, as observed in the baseline XRD pattern 302. In addition to the FePt magnetic recording layer (001) and (002) peaks, the intermediate layer (TiON/MgO) and underlayer (RuAl) peaks can also be observed from FIG. 4.

Figure 5A:
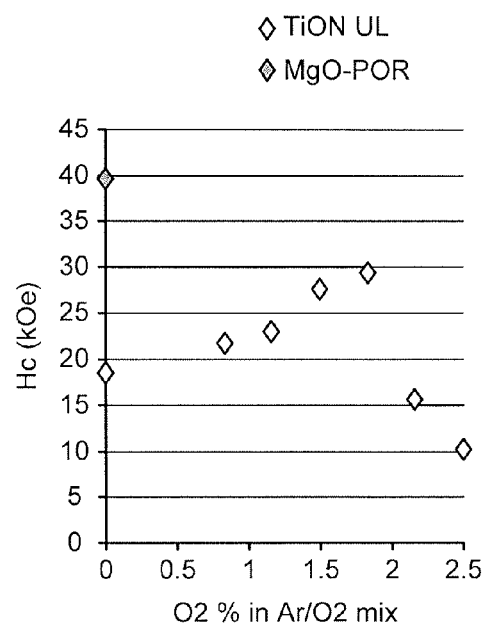
FIG. 5A illustrates exemplary magnetic properties of HAMR media with an FePt—AgC magnetic recording layer on a TiON intermediate layer at different sputter oxygen percentages of the TiON intermediate layer in comparison with the magnetic property of an FePt—AgC magnetic recording layer on an MgO intermediate layer in accordance with one embodiment of the invention.

FIG. 5A illustrates exemplary magnetic properties of HAMR media with an FePt—AgC magnetic recording layer on a TiON intermediate layer at different sputter oxygen percentages of the TiON intermediate layer (TiON UL) in comparison with the magnetic property of an FePt—AgC magnetic recording layer on an MgO intermediate layer (MgO—POR) in accordance with one embodiment of the invention. As can be seen in FIG. 5A, the coercivity (Hc) of an FePt—AgC magnetic recording layer on an MgO intermediate layer (MgO—POR) is about 40 kiloOersteds (kOe). By comparison, the coercivity of a FePt—AgC magnetic recording layer on a TiON intermediate layer (TiON UL) varies between about 10 kOe and 30 kOe, depending on the $O_2$ content percentage used during dc-reactive sputtering of the TiON intermediate layer. The maximum coercivity of about 30 kOe occurs at an $O_2$ sputter content of about 1.8 percent. Thus, the magnetic properties of a FePt magnetic recording layer including a carbon segregant are adversely affected when deposited over a TiON intermediate layer.

Figure 5B:
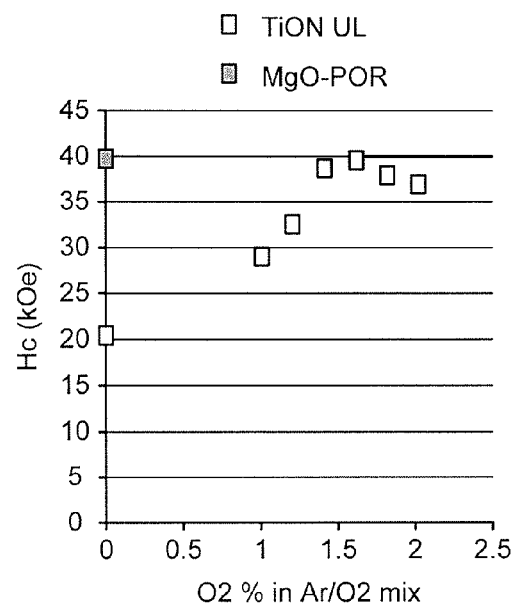
FIG. 5B illustrates exemplary magnetic properties of HAMR media with an FePt—AgBN magnetic recording layer on a TiON intermediate layer at different sputter oxygen percentages of the TiON intermediate layer in comparison with the magnetic property of an FePt—AgC magnetic recording layer on an MgO intermediate layer in accordance with one embodiment of the invention.

FIG. 5B illustrates exemplary magnetic properties of HAMR media with an FePt—AgBN magnetic recording layer on a TiON intermediate layer at different sputter oxygen percentages of the TiON intermediate layer (TiON UL) in comparison with the magnetic property of an FePt—AgC magnetic recording layer on an MgO intermediate layer (MgO—POR) in accordance with one embodiment of the invention. As can be seen in FIG. 5B, the coercivity of an FePt—AgBN magnetic recording layer on a TiON intermediate layer (TiON UL) varies between about 20 kOe and 40 kOe, depending on the $O_2$ content percentage used during dc-reactive sputtering of the TiON intermediate layer. The maximum coercivity of about 40 kOe occurs at an $O_2$ sputter content of about 1.6 percent. The maximum coercivity of the FePt—AgBN magnetic recording layer at about 1.6 percent $O_2$ content of the TiON intermediate layer (TiON UL) is approximately equal that of the FePt—AgC magnetic recording layer on MgO (MgO—POR). Therefore, similar magnetic properties to that found in FePt—C magnetic recording layers deposited over an MgO intermediate layer can be achieved by using a BN segregant in the FePt magnetic recording layer deposited over a TiON intermediate layer.

Figure 6A:
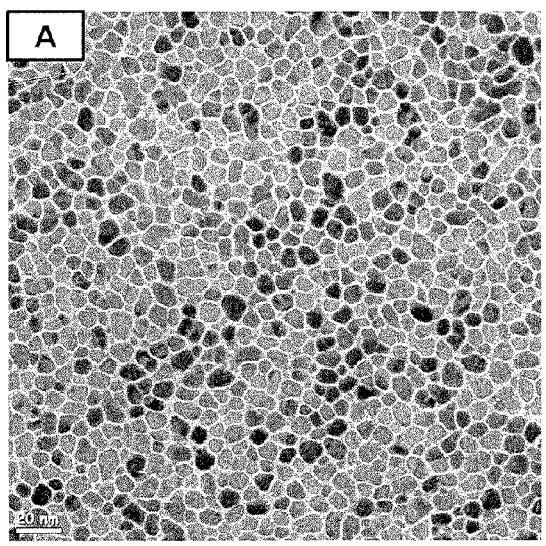
FIGS. 6A and 6B are plan transmission electron microscope (TEM) views of HAMR media with an FePt—AgBN magnetic recording layer on a TiON intermediate layer and an FePt—AgC magnetic recording layer on an MgO intermediate layer in accordance with one embodiment of the invention.
Figure 6B:
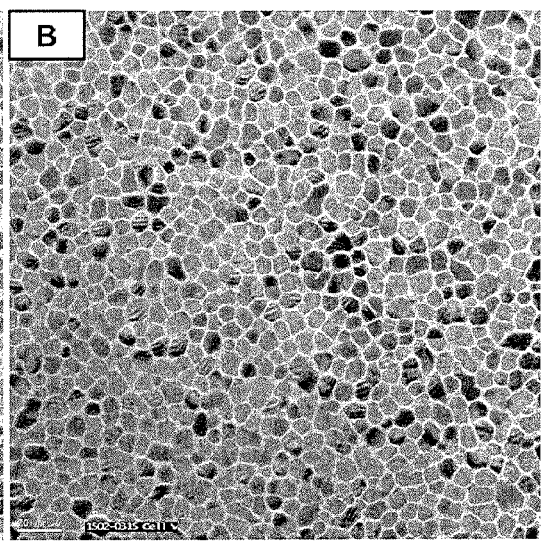

FIGS. 6A and 6B are plan transmission electron microscope (TEM) views of HAMR media with an FePt—AgBN magnetic recording layer on a TiON intermediate layer and an FePt—AgC magnetic recording layer on an MgO intermediate layer in accordance with one embodiment of the invention. As can be seen by comparing FIGS. 6A and 6B, the microstructure of the FePt—AgBN magnetic recording layer deposited over a TiON intermediate layer is similar to the microstructure of the FePt—AgC magnetic recording layer deposited on an MgO intermediate layer.

Figure 7:
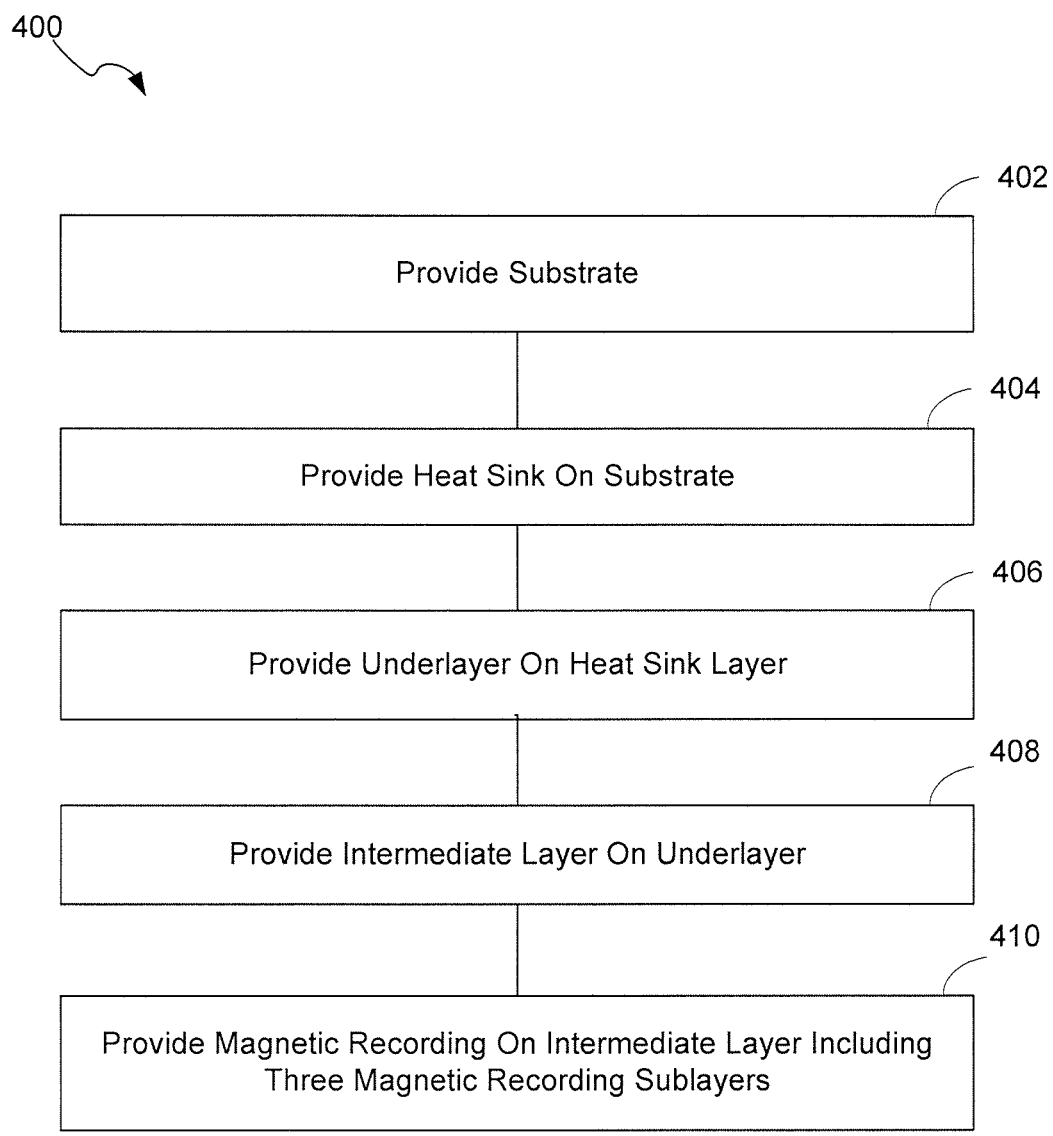
FIG. 7 is a flowchart of a process for manufacturing a HAMR medium including a FePt magnetic recording layer, an intermediate layer and an underlayer in accordance with one embodiment of the invention.

FIG. 7 is a flowchart of a process 400 for manufacturing a HAMR medium including a FePt magnetic recording layer, an intermediate layer and an underlayer in accordance with one embodiment of the invention. In particular embodiments, the process 400 can be used to manufacture the HAMR magnetic media of FIG. 3, FIG. 2, or FIG. 1. The process first provides a substrate in block 402. The process then provides a heat sink layer on the substrate in block 404. The process then provides an underlayer on the heat sink layer in block 406. The process then provides an intermediate layer on the underlayer in block 408. The process then provides a magnetic recording layer including three magnetic recording sublayers on the intermediate layer in block 410.

In a number of embodiments, the process can manufacture the layers of the HAMR medium with any of the numerous variations described above for the embodiments of FIGS. 1, 2, and 3. For example, in one such case, the process can also provide an adhesion layer between the substrate and the heat sink layer, a seed layer between the adhesion layer and the heat sink layer, and a carbon overcoat layer on the magnetic recording layer.

In several embodiments, the layers can include the materials described above. For example, the process may provide the underlayer on the heat sink layer by depositing a layer of TiN, CrN, RuAl, SrTiO$_3$, MgO, W, Mo, Cr, NiAl, and/or combinations thereof on the heat sink layer. In addition, the process may provide the intermediate layer on the underlayer by depositing a layer of TiON, VON, CrON, TiOC, VOC, TiONC, and/or combinations thereof on the underlayer.

In some embodiments, the process provides the underlayer on the heat sink layer by sputter-depositing the underlayer using a pure TiN target in pure Ar gas to produce a TiN underlayer. In some embodiments, the process provides the intermediate layer on the underlayer by dc-reactive sputtering the intermediate layer using a pure TiN target in mixed Ar/O$_2$ gas to produce a TiON intermediate layer. For example, the O$_2$ content percentage in the mixed Ar/O$_2$ gas may be between about 1.6 and 1.8. In some embodiments, the process provides the intermediate layer on the underlayer by using a non-reactive sputtering process with a composite target of TiON.

In some embodiments, the process provides the magnetic recording layer by sputter-depositing the FePt—X granular magnetic recording sublayers onto the TiON/TiN layers. For example, the segregant used in the first magnetic recording sublayer may include AgBN, AgCN, AgBNC, AgB$_2$O$_3$, AgMoO$_3$, AgV$_2$O$_5$, B$_2$O$_3$, MoO$_3$, V$_2$O$_5$, and/or combinations thereof. As another example, the segregant used in the second magnetic recording sublayer may include BNC, BN, and/or combinations thereof. As yet another example, the segregant used in the third magnetic recording sublayer may include BNSiO$_2$, BNZrO$_2$, BNTa$_2$O$_5$, and/or combinations thereof.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A medium for heat assisted magnetic recording, the medium comprising:
   a substrate;
   a heat sink layer on the substrate;
   an underlayer on the heat sink layer;
   an intermediate layer on the underlayer, the intermediate layer comprising a material selected from the group consisting of: TiON, VON, CrON, TiOC, VOC, TiONC, VONC, and combinations thereof; and
   a magnetic recording layer on the intermediate layer, the magnetic recording layer comprising:
   a first magnetic recording sublayer on the intermediate layer, the first magnetic recording sublayer comprising FePt with a first segregant, the first segregant comprising a material selected from the group consisting of: AgBN, AgCN, AgBNC, AgB$_2$O$_3$, AgMoO$_3$, AgV$_2$O$_5$, B$_2$O$_3$, MoO$_3$, V$_2$O$_5$, and combinations thereof,
   a second magnetic recording sublayer on the first magnetic recording sublayer, the second magnetic recording sublayer comprising FePt with a second segregant different than the first segregant, and
   a third magnetic recording sublayer on the second magnetic recording sublayer, the third magnetic recording sublayer comprising FePt with a third segregant different than the first segregant and the second segregant.

2. The medium of claim 1, wherein the intermediate layer comprises TiO$_x$N$_{(1-x)}$, where x is between about 0.4 and about 0.5.

3. The medium of claim 1, wherein the underlayer comprises a material selected from the group consisting of: TiN, CrN, VN, TiC, VC, RuAl, RuTi, FeAl, SrTiO$_3$, BaTiO$_3$, BaSnO$_3$, MgO, W, Mo, Cr, NiAl, and combinations thereof.

4. The medium of claim 3, wherein the underlayer comprises TiN.

5. The medium of claim 1, wherein the first segregant comprises AgBN.

6. The medium of claim 5, wherein the first segregant comprises a BN content between about 25 mole percent and about 40 mole percent.

7. The medium of claim 5, wherein the intermediate layer comprises TiON.

8. The medium of claim 1, wherein the second segregant comprises a material selected from the group consisting of: BNC, BN, and combinations thereof.

9. The medium of claim 1, wherein the third segregant comprises a material selected from the group consisting of: BNSiO$_2$, BNZrO$_2$, BNTa$_2$O$_5$, and combinations thereof.

10. The medium of claim 1, wherein the heat sink layer comprises a material selected from the group consisting of: W, Mo, Ru, Cr, Cu, Ag, Cu alloy, Ag alloy, and combinations thereof.

11. The medium of claim 1, further comprising:
    an adhesion layer on the substrate, the adhesion layer comprising a material selected from the group consisting of: CrTa, NiTa, and combinations thereof;
    a seed layer on the adhesion layer, the seed layer comprising a material selected from the group consisting of: RuAl, Cr, and combinations thereof;
    wherein the heat sink layer is on the seed layer.

12. The medium of claim 1, wherein the intermediate layer is deposited using a reactive sputtering process in a mixture of Ar gas and O$_2$ gas.

13. The medium of claim 12, wherein the mixture of Ar gas and O$_2$ gas comprises between about 1.6 percent O$_2$ and about 1.8 percent O$_2$.

14. The medium of claim 1, wherein the intermediate layer is deposited using a non-reactive sputtering process with a composite target comprising TiON.

15. A heat assisted magnetic recording system comprising:
    the medium of claim 1;
    a near-field transducer light source configured to direct light energy on to the medium; and
    a magnetic transducer configured to write information to the medium.

16. A method for fabricating a medium for heat assisted magnetic recording, the method comprising:
    providing a substrate;
    providing a heat sink layer on the substrate;

providing an underlayer on the heat sink layer;
providing an intermediate layer on the underlayer, the intermediate layer comprising a material selected from the group consisting of: TiON, VON, CrON, TiOC, VOC, TiONC, VONC, and combinations thereof; and
providing a magnetic recording layer on the intermediate layer, the magnetic recording layer comprising:
   a first magnetic recording sublayer on the intermediate layer, the first magnetic recording sublayer comprising FePt with a first segregant, the first segregant comprising a material selected from the group consisting of: AgBN, AgCN, AgBNC, $AgB_2O_5$, $AgMoO_3$, $AgV_2O_5$, $B_2O_3$, $MoO_3$, $V_2O_5$, and combinations thereof,
   a second magnetic recording sublayer on the first magnetic recording sublayer, the second magnetic recording sublayer comprising FePt with a second segregant different than the first segregant, and
   a third magnetic recording sublayer on the second magnetic recording sublayer, the third magnetic recording sublayer comprising FePt with a third segregant different than the first segregant and the second segregant.

17. The method of claim 16, wherein the intermediate layer comprises $TiO_xN_{(1-x)}$, where x is between about 0.4 and about 0.5.

18. The method of claim 16, wherein the underlayer comprises a material selected from the group consisting of: TiN, CrN, VN, TiC, VC, RuAl, RuTi, FeAl, $SrTiO_3$, $BaTiO_3$, $BaSnO_3$, MgO, W, Mo, Cr, NiAl, and combinations thereof.

19. The method of claim 16, wherein the underlayer comprises TiN.

20. The method of claim 16, wherein the first segregant comprises AgBN.

21. The method of claim 20, wherein the first segregant comprises a BN content between about 25 mole percent and about 40 mole percent.

22. The method of claim 20, wherein the intermediate layer comprises TiON.

23. The method of claim 16, wherein the second segregant comprises a material selected from the group consisting of: BNC, BN, and combinations thereof.

24. The method of claim 16, wherein the third segregant comprises a material selected from the group consisting of: $BNSiO_2$, $BNZrO_2$, $BNTa_2O_5$, and combinations thereof.

25. The method of claim 16, wherein the heat sink layer comprises a material selected from the group consisting of: W, Mo, Ru, Cr, Cu, Ag, Cu alloy, Ag alloy, and combinations thereof.

26. The method of claim 16, further comprising:
   providing an adhesion layer on the substrate, the adhesion layer comprising a material selected from the group consisting of: CrTa, NiTa, and combinations thereof;
   providing a seed layer on the adhesion layer, the seed layer comprising a material selected from the group consisting of RuAl, Cr, and combinations thereof;
   wherein the heat sink layer is on the seed layer.

27. The method of claim 16, wherein providing the underlayer on the heat sink layer comprises:
   depositing the underlayer using a sputtering process in substantially pure Ar gas.

28. The method of claim 27, wherein providing the intermediate layer comprises:
   depositing the intermediate layer on the underlayer using a reactive sputtering process in a mixture of Ar gas and $O_2$ gas.

29. The method of claim 28:
   wherein the underlayer comprises TiN; and
   wherein the intermediate layer comprises $TiO_xN_{(1-x)}$, where x is between about 0.4 and about 0.5.

30. The method of claim 28, wherein the mixture of Ar gas and $O_2$ gas comprises between about 1.6 percent $O_2$ and about 1.8 percent $O_2$.

31. The method of claim 16, wherein providing the intermediate layer comprises:
   depositing the intermediate layer using a non-reactive sputtering process with a composite target comprising TiON.

* * * * *